United States Patent
Li et al.

(10) Patent No.: US 11,467,773 B2
(45) Date of Patent: Oct. 11, 2022

(54) DATA ACCESSING METHOD, MEMORY CONTROL CIRCUIT UNIT AND MEMORY STORAGE DEVICE

(71) Applicant: PHISON ELECTRONICS CORP., Miaoli (TW)

(72) Inventors: Wei-Cheng Li, Miaoli County (TW); Yu-Chung Shen, Miaoli County (TW); Nien-Hung Lin, Changhua County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 11 days.

(21) Appl. No.: 17/177,214

(22) Filed: Feb. 17, 2021

(65) Prior Publication Data

US 2022/0229592 A1  Jul. 21, 2022

(30) Foreign Application Priority Data

Jan. 20, 2021 (TW) .................. 110102183

(51) Int. Cl.
G06F 12/00 (2006.01)
G06F 3/06 (2006.01)
G06F 12/10 (2016.01)
G06F 11/10 (2006.01)

(52) U.S. Cl.
CPC .......... *G06F 3/0659* (2013.01); *G06F 3/0619* (2013.01); *G06F 3/0679* (2013.01); *G06F 11/1068* (2013.01); *G06F 12/10* (2013.01); *G06F 2212/657* (2013.01)

(58) Field of Classification Search
CPC .... G06F 3/0659; G06F 3/0619; G06F 3/0679; G06F 11/1068; G06F 12/10; G06F 2212/657
USPC ........................................................ 711/103
See application file for complete search history.

(56) References Cited

U.S. PATENT DOCUMENTS

| | | | |
|---|---|---|---|
| 2011/0035602 A1* | 2/2011 | Meng .................... | H04L 9/0662 713/193 |
| 2014/0331107 A1* | 11/2014 | Cheng ................. | G06F 12/0246 714/773 |
| 2020/0174690 A1* | 6/2020 | Byun .................... | G06F 3/0688 |
| 2021/0318963 A1* | 10/2021 | Kim .................... | G06F 12/1009 |

* cited by examiner

Primary Examiner — Mardochee Chery
(74) Attorney, Agent, or Firm — JCIPRNET (57) ABSTRACT

A data accessing method, a memory control circuit unit, and a memory storage device are provided. The data accessing method includes the following steps. A reading command is received from a host system, in which the reading command instructs to read a first logical address, the first logical address is mapped to a first physical programming unit, and the first physical programming unit corresponds to a first physical erasing unit. A first data is generated after receiving the reading command, and the first data is written to a second physical programming unit included in the first physical erasing unit. A second data stored in the first physical programming unit is read after the first data is written, so as to respond to the reading command.

30 Claims, 6 Drawing Sheets

DATA ACCESSING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 110102183, filed on Jan. 20, 2021. The entirety of the above-mentioned patent application is hereby incorporated by reference herein and made a part of this specification.

BACKGROUND

Technical Field

This disclosure relates to a memory data reading technology, and in particular to a data accessing method, a memory control circuit unit, and a memory storage device.

Description of Related Art

Rapid growth in digital cameras, mobile phones and MP3 players over the past few years has led to a rapid increase in consumer demand for storage media. Since a rewriteable non-volatile memory module (for example, a flash memory) has characteristics such as non-volatile data, power saving, small size, and no mechanical structure, it is very suitable to be built in the abovementioned various portable multimedia devices.

The rewriteable non-volatile memory module usually includes multiple physical erasing units. In the process of data writing and erasing, the physical erasing unit will wear out as electrons are repeatedly injected and removed. Therefore, after multiple writing and erasing, the physical erasing unit may not be able to correctly identify its storage state and generates bit errors. In addition, the data stored in the physical erasing unit may be lost or result in bit errors after being accessed repeatedly or after a long period of inactivity. Therefore, how to reduce the probability of occurrence of bit errors remains a challenge for those skilled in the art.

SUMMARY

An exemplary embodiment of the disclosure provides a data accessing method, a memory control circuit unit and a memory storage device, which can reduce the probability of generating bit errors during data reading.

An exemplary embodiment of the disclosure provides a data accessing method for a rewriteable non-volatile memory module controlled by a memory control circuit unit. The rewriteable non-volatile memory module includes multiple physical erasing units, and each of the multiple physical erasing units includes multiple physical programming units. The data accessing method includes the following steps. A reading command is received from a host system, in which the reading command instructs to read a first logical address, the first logical address is mapped to a first physical programming unit, and the first physical programming unit corresponds to a first physical erasing unit. A first data is generated after receiving the reading command, and the first data is written to a second physical programming unit included in the first physical erasing unit. And a second data stored in the first physical programming unit is read after the first data is written, so as to respond to the reading command.

In an exemplary embodiment of the disclosure, the step of generating the first data includes the following steps. A data length corresponding to the second physical programming unit is calculated. And, valid data of the data length is read from the memory control circuit unit, so as to generate the first data.

In an exemplary embodiment of the disclosure, the step of generating the first data includes the following steps. A data length corresponding to the second physical programming unit is calculated. And, valid data of the data length is read from the memory control circuit unit and the valid data is randomly scrambled, so as to generate the first data.

In an exemplary embodiment of the disclosure, before the step of writing the first data to the second physical programming unit included in the first physical erasing unit, the method further includes the following steps. The second data stored in multiple physical addresses of the first physical programming unit is read. And, a decoding operation is executed on the second data, in which the first data is generated according to data stored in the memory control circuit unit when the second data decoded by the decoding operation has a data unit with an uncorrectable error.

In an exemplary embodiment of the disclosure, the method further includes re-reading the second data stored in the first physical programming unit after the first data is written.

In an exemplary embodiment of the disclosure, the first physical erasing unit includes multiple of the second physical programming unit, and a data length of the first data satisfies a data length corresponding to the multiple second physical programming units. Each of the multiple second physical programming units is a physical programming unit with no written data in the first physical erasing unit.

In an exemplary embodiment of the disclosure, the rewriteable non-volatile memory module is managed based on the multiple physical erasing units.

In an exemplary embodiment of the disclosure, after receiving the reading command, the method further includes the following steps. Whether a data writing state of the first physical erasing unit satisfies a predetermined state is determined. The second data is directly read when the data writing state satisfies the predetermined state, so as to respond to the reading command. The second data is read after the first data is written when the data writing state does not satisfy the predetermined state, so as to respond to the reading command.

In an exemplary embodiment of the disclosure, the predetermined state is a state in which all of the physical programming units included in the first physical erasing unit have been programmed. The step of reading the second data after the first data is written when the data writing state does not satisfy the predetermined state, so as to respond to the reading command, includes the following steps. The first data is written to the second physical programming unit included in the first physical erasing unit, and whether the data writing state satisfies the predetermined state is determined. And the second data is read in response to determination of satisfaction of the predetermined state, so as to respond to the reading command.

In an exemplary embodiment of the disclosure, the predetermined state is a state in which other physical programming units associated with a same word line as the first physical programming unit have been programmed. The step of reading the second data after the first data is written when the data writing state does not satisfy the predetermined state, so as to respond to the reading command, includes the following steps. The first data is written to the other physical programming unit associated with the same word line as the first physical programming unit, and whether the data writing state satisfies the predetermined state is determined. And the second data is read in response to determination of satisfaction of the predetermined state, so as to respond to the reading command.

In an exemplary embodiment of the disclosure, the step of writing the first data to the second physical programming unit included in the first physical erasing unit is not in response to a writing command sent by the host system.

An exemplary embodiment of the disclosure provides a memory control circuit unit for controlling a rewriteable non-volatile memory module. The memory control circuit unit includes a host interface, a memory interface, a buffer memory, an error checking and correcting circuit, and a memory management circuit. The host interface is configured to be coupled to the host system. The memory interface is configured to be coupled to the rewriteable non-volatile memory module. The rewriteable non-volatile memory module includes multiple physical erasing units, and each of the multiple physical erasing units includes multiple physical programming units. The memory management circuit is coupled to the host interface and the memory interface. The memory management circuit is configured to receive a reading command from the host system. The reading command instructs to read a first logical address, the first logical address is mapped to a first physical programming unit, and the first physical programming unit corresponds to a first physical erasing unit. The memory management circuit is further configured to generate a first data after receiving the reading command, and write the first data to a second physical programming unit included in the first physical erasing unit. Moreover, the memory management circuit is further configured to read a second data stored in the first physical programming unit after the first data is written, so as to respond to the reading command.

In an exemplary embodiment of the disclosure, the memory management circuit is further configured to calculate a data length corresponding to the second physical programming unit. Moreover, the memory management circuit is further configured to read valid data of the data length from the buffer memory, so as to generate the first data.

In an exemplary embodiment of the disclosure, the memory management circuit is further configured to calculate a data length corresponding to the second physical programming unit. Moreover, the memory management circuit is further configured to read valid data of the data length from the buffer memory and randomly scramble the valid data, so as to generate the first data.

In an exemplary embodiment of the disclosure, the memory management circuit is further configured to read the second data stored in multiple physical addresses of the first physical programming unit. Moreover, the error checking and correcting circuit is configured to execute a decoding operation on the second data. The memory management circuit is further configured to generate the first data according to data stored in the buffer memory when the second data decoded by the decoding operation has a data unit with an uncorrectable error.

In an exemplary embodiment of the disclosure, the memory management circuit is further configured to re-read the second data stored in the first physical programming unit after the first data is written.

In an exemplary embodiment of the disclosure, the first physical erasing unit includes multiple of the second physical programming unit, and a data length of the first data satisfies a data length corresponding to the multiple second physical programming units. Each of the multiple second physical programming units is a physical programming unit with no written data in the first physical erasing unit.

In an exemplary embodiment of the disclosure, the rewriteable non-volatile memory module is managed based on the multiple physical erasing units.

In an exemplary embodiment of the disclosure, the memory management circuit is further configured to determine whether a data writing state of the first physical erasing unit satisfies a predetermined state. The memory management circuit is further configured to directly read the second data when the data writing state satisfies the predetermined state, so as to respond to the reading command. The memory management circuit is further configured to read the second data after the first data is written when the data writing state does not satisfy the predetermined state, so as to respond to the reading command.

In an exemplary embodiment of the disclosure, the predetermined state is a state in which all of the physical programming units included in the first physical erasing unit have been programmed. The memory management circuit is further configured to read the second data after the first data is written when the data writing state does not satisfy the predetermined state, so as to respond to the reading command, and this operation includes the following. The memory management circuit is further configured to write the first data to the second physical programming unit included in the first physical erasing unit and determine whether the data writing state satisfies the predetermined state. Moreover, the memory management circuit is further configured to read the second data in response to determination of satisfaction of the predetermined state, so as to respond to the reading command.

In an exemplary embodiment of the disclosure, the predetermined state is a state in which other physical programming units associated with a same word line as the first physical programming unit have been programmed. The memory management circuit is further configured to read the second data after the first data is written when the data writing state does not satisfy the predetermined state, so as to respond to the reading command, and this operation includes the following. The memory management circuit is further configured to write the first data to the other physical programming unit associated with the same word line as the first physical programming unit and determine whether the data writing state satisfies the predetermined state. Moreover, the memory management circuit is further configured to read the second data in response to determination of satisfaction of the predetermined state, so as to respond to the reading command.

In an exemplary embodiment of the disclosure, writing the first data to the second physical programming unit included in the first physical erasing unit by the memory management circuit is not in response to a writing command sent by the host system.

An exemplary embodiment of the disclosure provides a memory storage device including a connection interface unit, a rewriteable non-volatile memory module, and a memory control circuit unit. The connection interface unit is configured to be coupled to the host system. The rewriteable non-volatile memory module includes multiple physical erasing units, and each of the multiple physical erasing units includes multiple physical programming units. The memory control circuit unit is coupled to the connection interface unit and the rewriteable non-volatile memory module. The memory control circuit unit is configured to receive a reading command from the host system. The reading command instructs to read a first logical address, the first logical address is mapped to a first physical programming unit, and the first physical programming unit corresponds to a first physical erasing unit. The memory control circuit unit is further configured to generate a first data after receiving the reading command, and write the first data to the second physical programming unit included in the first physical erasing unit. Moreover, the memory control circuit unit is further configured to read the second data stored in the first physical programming unit after the first data is written, so as to respond to the reading command.

In an exemplary embodiment of the disclosure, the memory control circuit unit is further configured to calculate a data length corresponding to the second physical programming unit. Moreover, the memory control circuit unit is further configured to read valid data of the data length from the memory control circuit unit, so as to generate the first data.

In an exemplary embodiment of the disclosure, the memory control circuit unit is further configured to calculate a data length corresponding to the second physical programming unit. Moreover, the memory control circuit unit is further configured to read valid data of the data length from the memory control circuit unit and randomly scramble the valid data, so as to generate the first data.

In an exemplary embodiment of the disclosure, the memory control circuit unit is further configured to read the second data stored in multiple physical addresses of the first physical programming unit. Moreover, the memory control circuit unit is further configured to execute a decoding operation on the second data. The memory control circuit unit is further configured to generate the first data according to data stored in the memory control circuit unit when the second data decoded by the decoding operation has a data unit with an uncorrectable error.

In an exemplary embodiment of the disclosure, the memory control circuit unit is further configured to re-read the second data stored in the first physical programming unit after the first data is written.

In an exemplary embodiment of the disclosure, the first physical erasing unit includes multiple of the second physical programming unit, and a data length of the first data satisfies a data length corresponding to the multiple second physical programming units. Each of the multiple second physical programming units is a physical programming unit with no written data in the first physical erasing unit.

In an exemplary embodiment of the disclosure, the rewriteable non-volatile memory module is managed based on the multiple physical erasing units.

In an exemplary embodiment of the disclosure, the memory control circuit unit is further configured to determine whether a data writing state of the first physical erasing unit satisfies a predetermined state. The memory control circuit unit is further configured to directly read the second data when the data writing state satisfies the predetermined state, so as to respond to the reading command. The memory control circuit unit is further configured to read the second data after the first data is written when the data writing state does not satisfy the predetermined state, so as to respond to the reading command.

In an exemplary embodiment of the disclosure, the predetermined state is a state in which all of the physical programming units included in the first physical erasing unit have been programmed. The memory control circuit unit is further configured to read the second data after the first data is written when the data writing state does not satisfy the predetermined state, so as to respond to the reading command, and this operation includes the following. The memory control circuit unit is further configured to write the first data to the second physical programming unit included in the first physical erasing unit and determine whether the data writing state satisfies the predetermined state. Moreover, the memory control circuit unit is further configured to read the second data in response to determination of satisfaction of the predetermined state, so as to respond to the reading command.

In an exemplary embodiment of the disclosure, the predetermined state is a state in which other physical programming units associated with a same word line as the first physical programming unit have been programmed. The memory control circuit unit is further configured to read the second data after the first data is written when the data writing state does not satisfy the predetermined state, so as to respond to the reading command, and this operation includes the following. The memory control circuit unit is further configured to write the first data to the other physical programming unit associated with the same word line as the first physical programming unit and determine whether the data writing state satisfies the predetermined state. Moreover, the memory control circuit unit is further configured to read the second data in response to determination of satisfaction of the predetermined state, so as to respond to the reading command.

In an exemplary embodiment of the disclosure, writing the first data to the second physical programming unit included in the first physical erasing unit by the memory control circuit unit is not in response to a writing command sent by the host system.

Based on the above, the disclosure may fill up the physical erasing unit having the state of not fully written with data such that it is converted to the physical erasing unit having the state of fully written with data, so as to prevent a great number of bit errors due to the reading of the physical programming unit of the physical erasing unit when the physical erasing unit is in the state of not fully written with data. In this way, the probability of generating bit errors during data reading can be reduced, so as to reduce errors generated during the reading of data.

To make the abovementioned more comprehensible, several embodiments accompanied by drawings are described in detail as follows.

It should be understood that this summary section may not contain all of the aspects and embodiments of the disclosure and is not meant to be limiting or restrictive in any manner. The disclosure as disclosed herein is and will be understood by those of ordinary skill in the art to encompass obvious improvements and modifications thereto.

DESCRIPTION OF THE EMBODIMENTS

In general, a memory storage device (also called a memory storage system) includes a rewriteable non-volatile memory module and a controller (also called a control circuit unit). The memory storage device is usually used together with the host system, enabling the host system to write data to the memory storage device or read data from the memory storage device.

Figure 1:
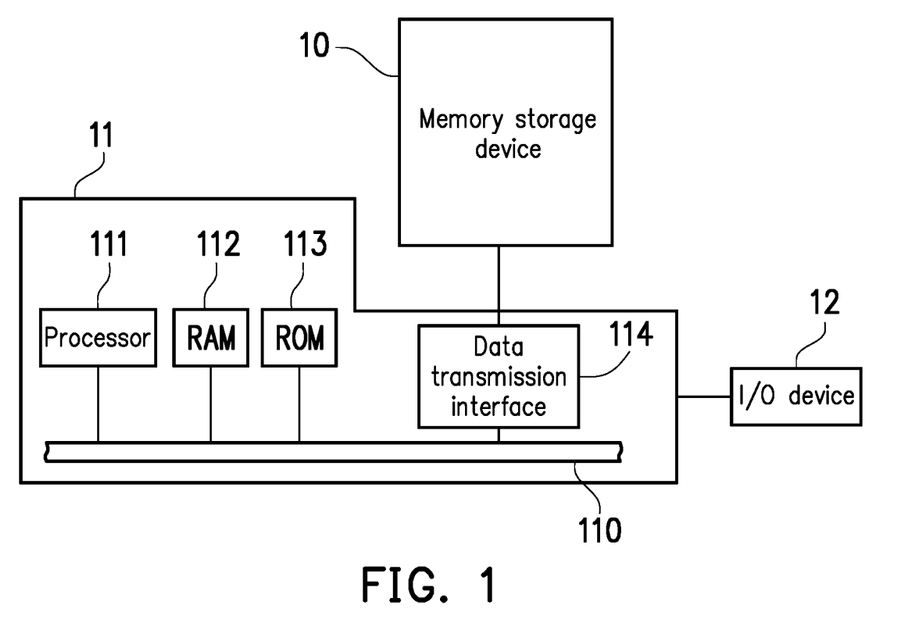
FIG. 1 is a schematic diagram of a host system, a memory storage device, and an input/output (I/O) device according to an exemplary embodiment of the disclosure.

FIG. 1 is a schematic diagram of a host system, a memory storage device, and an input/output (I/O) device according to an exemplary embodiment of the disclosure. In addition, FIG. 2 is a schematic diagram of a host system, a memory storage device, and an input/output (I/O) device according to another exemplary embodiment of the disclosure.

Figure 2:
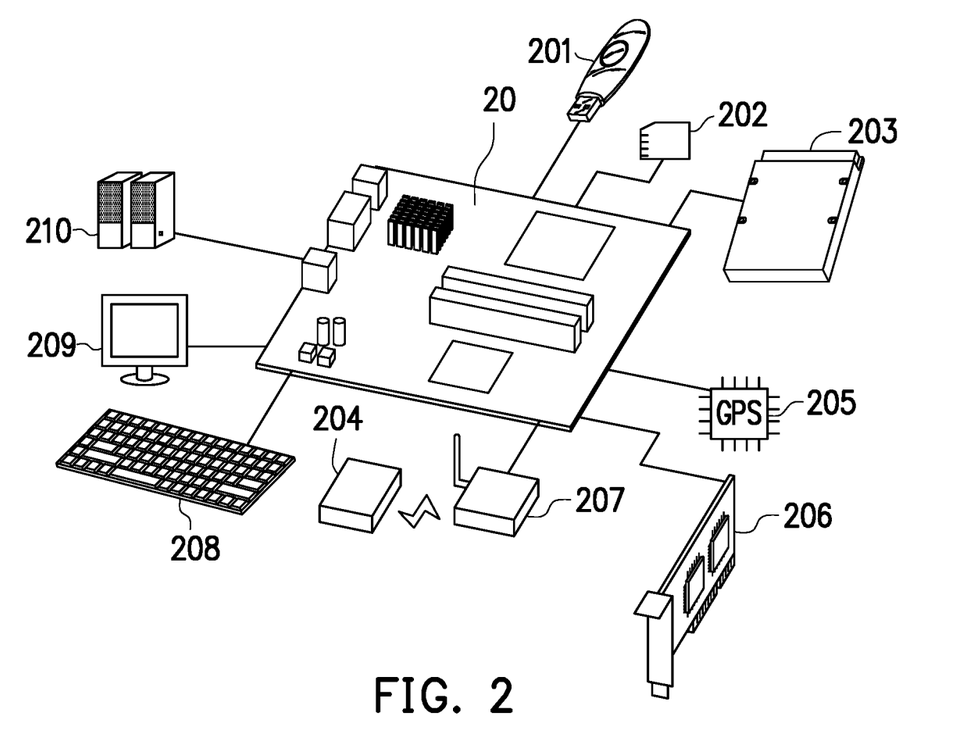
FIG. 2 is a schematic diagram of a host system, a memory storage device, and an input/output (I/O) device according to another exemplary embodiment of the disclosure.

With reference to FIGS. 1 and 2, a host system 11 generally includes a processor 111, a random access memory (RAM) 112, a read-only memory (ROM) 113, and a data transmission interface 114. The processor 111, the random access memory 112, the read-only memory 113, and data transmission interface 114 are all coupled to a system bus 110.

In the exemplary embodiment, the host system 11 is coupled to a memory storage device 10 through the data transmission interface 114. For example, the host system 11 may write data to or read data from the memory storage device 10 via the data transmission interface 114. In addition, the host system 11 is coupled to an I/O device 12 through the system bus 110. For example, the host system 11 may transmit an output signal to or receive an input signal from the I/O device 12 via the system bus 110.

In the exemplary embodiment, the processor 111, the random access memory 112, the read-only memory 113, and the data transmission interface 114 may be disposed on a motherboard 20 of the host system 11. There may be one or more of the data transmission interface 114. The motherboard 20 may be coupled to the memory storage device 10 through the data transmission interface 114, via a wired or a wireless means. The memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies such as a Near Field Communication Storage (NFC) memory storage device, a wireless fax (WiFi) memory storage device, a Bluetooth memory storage device, and a low-power Bluetooth memory storage device (for example, iBeacon). In addition, the motherboard 20 may also be coupled to various I/O devices such as a Global Positioning System (GPS) module 205, a network interface card 206, a wireless transmission device 207, a keyboard 208, a screen 209, and a speaker 210 through the system bus 110. For example, in an exemplary embodiment, the motherboard 20 may access the wireless memory storage device 204 through the wireless transmission device 207.

Figure 3:
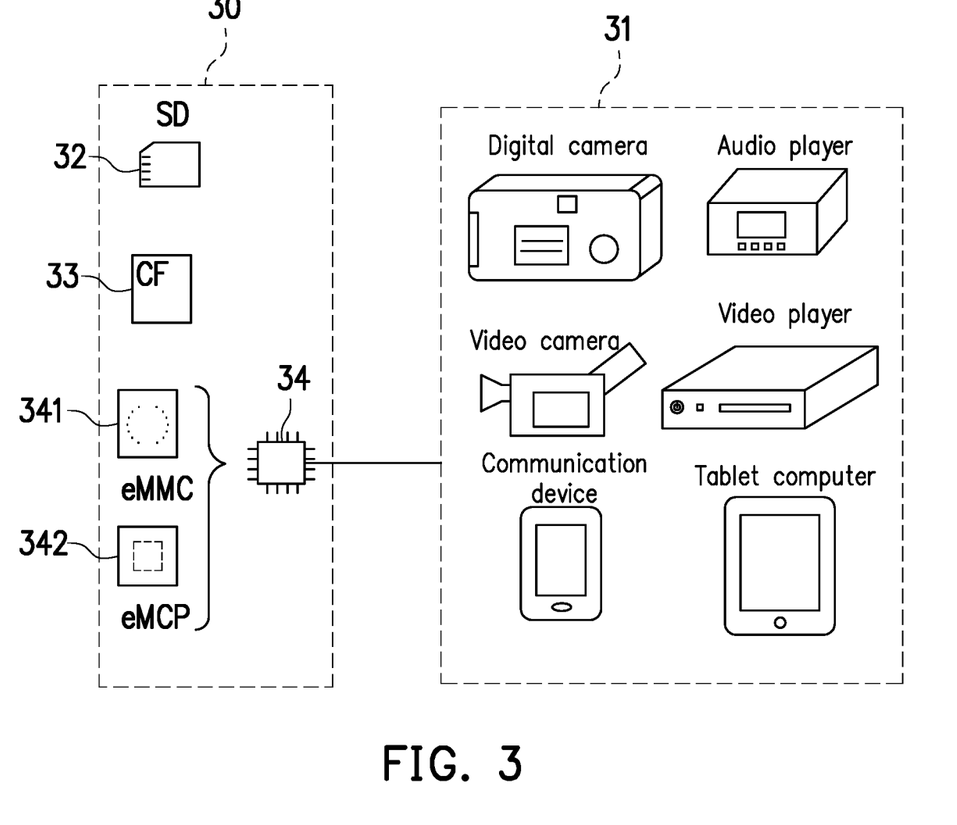
FIG. 3 is a schematic diagram of a host system and a memory storage device according to another exemplary embodiment of the disclosure.

In an exemplary embodiment, the host system is any system that may substantially cooperate with a memory storage device to store data. Although in the above exemplary embodiment, the host system is described as a computer system, FIG. 3 is a schematic diagram of a host system and a memory storage device according to another exemplary embodiment of the disclosure. With reference to FIG. 3, in another exemplary embodiment, a host system 31 may also be a system such as a digital camera, a video camera, a communication device, an audio player, a video player, or a tablet computer, and a memory storage device 30 may be various non-volatile memory storage devices used by the host system 31 such as a SD card 32, a CF card 33, and an embedded storage device 34. The embedded storage device 34 includes various embedded storage devices that couple a memory module directly to a substrate of the host system such as an embedded MMC (eMMC) 341, and/or an embedded Multi-Chip Package (eMCP) 342.

Figure 4:
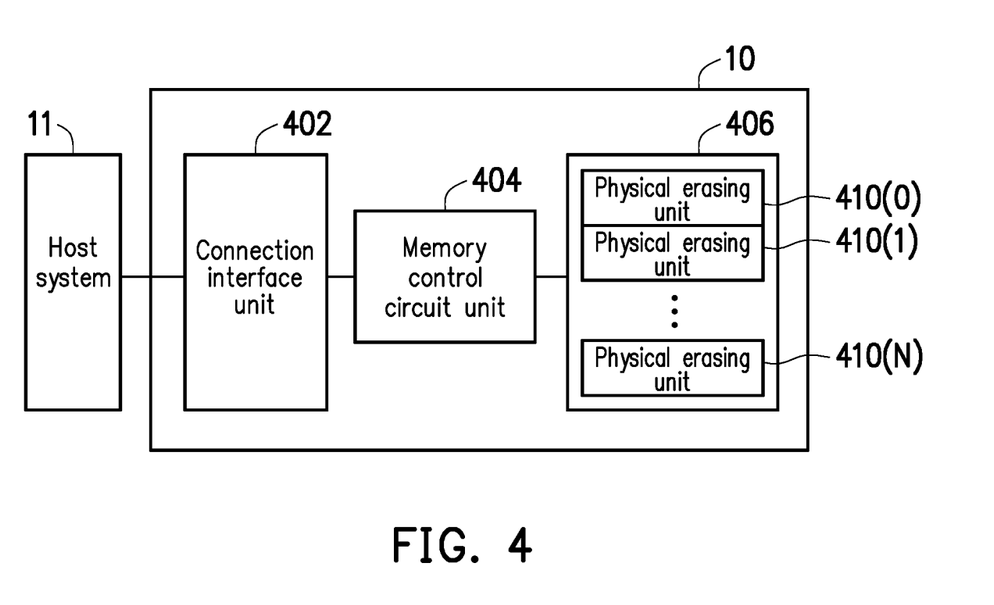
FIG. 4 is a schematic block diagram of a host system and a memory storage device according to an exemplary embodiment of the disclosure.

FIG. 4 is a schematic block diagram of a host system and a memory storage device according to an exemplary embodiment of the disclosure.

With reference to FIG. 4, the memory storage device 10 includes a connection interface unit 402, a memory control circuit unit 404, and a rewriteable non-volatile memory module 406.

In the exemplary embodiment, the connection interface unit 402 is compatible with the Secure Digital (SD) interface standard. However, it must be understood that the disclosure is not limited thereto. The connection interface unit 402 may also be in compliance with the Serial Advanced Technology Attachment (SATA) standard, the Parallel Advanced Technology Attachment (PATA) standard, the Institute of Electrical and Electronic Engineers (IEEE) 1394 standard, the high-speed Peripheral Component Interconnect Express (PCI Express) standard, the universal serial bus (USB) standard, the Ultra High-Speed I (UHS-I) interface standard, the Ultra High-Speed II (UHS-II) interface standard, the Memory Stick (MS) interface standard, the Multi-Chip package (MCP) interface standard, the MultiMedia Card (MMC) interface standard, the embedded MultiMedia Card (eMMC) interface standard, the Universal Flash Storage (UFS) interface standard, the embedded Multi-Chip Package (eMCP) interface standard, the CompactFlash (CF) interface standard, the Integrated Device Electronics (IDE) standard or other suitable standards. In the exemplary embodiment, the connection interface unit 402 and the memory control circuit unit 404 may be packaged in a chip, or the connection interface unit 402 may be disposed outside a chip that includes the memory control circuit unit.

The memory control circuit unit 404 is configured to execute multiple logic gates or control commands implemented in hardware or firmware, and to perform operations such as data writing, reading, or erasing in the rewriteable non-volatile memory module 406 according to a command of the host system 11.

The rewriteable non-volatile memory module 406 is coupled to the memory control circuit unit 404 and is configured to store data written by the host system 11. The rewriteable non-volatile memory module 406 has physical erasing units 410(0) to 410(N). For example, the physical erasing units 410(0) to 410(N) may belong to a same memory die or belong to different memory dies. Each of the physical erasing units has multiple physical programming units, and the physical programming units belonging to the same physical erasing unit may be written independently and erased simultaneously. However, it must be understood that the disclosure is not limited thereto, and each of the physical erasing units may be composed of 64 physical programming units, 256 physical programming units, or any other number of physical programming units.

In more detail, the physical erasing unit is a smallest unit of erasure. That is, each of the physical erasing units contains a smallest number of memory cells that are erased together. The physical programming unit is a smallest unit of programming. That is, the physical programming unit is a smallest unit for writing data. Each of the physical programming units usually includes a data bit region and a redundancy bit region. The data bit region contains multiple physical access addresses that are configured to store user data, and the redundant bit region is configured to store system data (for example, management data such as control information and error correcting codes). In the exemplary embodiment, the data bit region of each of the physical programming units includes 8 physical access addresses, and a size of one physical access address is 512 bytes. However, in other exemplary embodiments, the data bit region may also include more or less physical access addresses, and the disclosure does not limit the size and number of physical access addresses. For example, in an exemplary embodiment, the physical erasing unit is a physical block, and the physical programming unit is a physical page, or a physical sector, but the disclosure is not limited thereto.

In the exemplary embodiment, the rewriteable non-volatile memory module 406 is a Single-Level Cell (SLC) NAND flash memory module (that is, a flash memory module that may store one data bit in a memory cell). However, the disclosure is not limited thereto. The rewriteable non-volatile memory module 406 may also be a Multi-Level Cell (MLC) NAND flash memory module (that is, a flash memory module that may store two data bits in a memory cell), a Trinary-Level Cell (TLC) NAND flash memory module (that is, a flash memory module that may store three data bits in a memory cell) or other memory modules with the same characteristic. Specifically, memory cells on a same word line may form one or more of the physical programming units. If each of the memory cells may store more than two bits, the physical programming unit on the same word line may be at least classified into a lower physical programming unit and an upper physical programming unit. The physical programming units composed of the same memory cells belongs to a pair page. For example, a least significant bit (LSB) of a memory cell belongs to the lower physical programming unit, and the most significant bit (MSB) of a memory cell belongs to the upper physical programming unit. In general, in the MLC NAND flash memory, a writing speed of the lower physical programming unit is greater than a writing speed of the upper physical programming unit, and/or a reliability of the lower physical programming unit is higher than a reliability of the upper physical programming unit.

Each of the memory cells in the rewriteable non-volatile memory module 406 stores one or more bits by changing a voltage (hereinafter also referred to as a threshold voltage). Specifically, there is a charge trapping layer between a control gate and a channel of each of the memory cells. By applying a writing voltage to the control gate, an amount of electrons in the charge trapping layer may be changed, thereby changing the threshold voltage of the memory cell. This operation of changing the threshold voltage of the memory cell is also called "writing of data to the memory cell" or "programming of the memory cell". Each of the memory cells in the rewriteable non-volatile memory module 406 has multiple storage states following changes in the threshold voltage. It is possible to determine which storage state a memory cell belongs to by applying a reading voltage, thereby obtaining the one or more bits stored in the memory cell.

Figure 5:
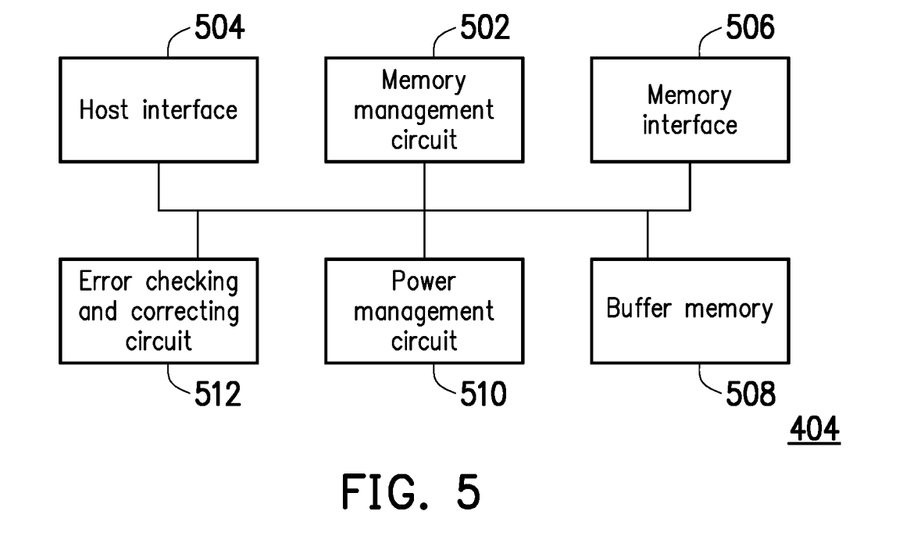
FIG. 5 is a schematic block diagram of the memory control circuit unit according to an exemplary embodiment of the disclosure.

FIG. 5 is a schematic block diagram of the memory control circuit unit according to an exemplary embodiment of the disclosure.

With reference to FIG. 5, the memory control circuit unit 404 includes a memory management circuit 502, a host interface 504, and a memory interface 506.

The memory management circuit 502 is configured to control an overall operation of the memory control circuit unit 404. Specifically, the memory management circuit 502 has multiple control commands, and during operation of the memory storage device 10, the control command is executed to perform the operations such as data writing, reading, and erasing. The following description of an operation of the memory management circuit 502 is equivalent to the description of an operation of the memory control circuit unit 404.

In the exemplary embodiment, the control command of the memory management circuit 502 is implemented in firmware. For example, the memory management circuit 502 has a microprocessor unit (not shown) and a read-only memory (not shown), and the control command is programmed into the read-only memory. During the operation of the memory storage device 10, the control command is executed by the microprocessor unit to perform the operations such as data writing, reading, and erasing.

In another exemplary embodiment of the disclosure, the control command of the memory management circuit 502 may also be stored as a code in a specific region (for example, a system region dedicated to storing system data in the memory module) of the rewriteable non-volatile memory module 406. In addition, the memory management circuit 502 has a microprocessor unit (not shown), a read-only memory (not shown), and a random access memory (not shown). In particular, the read-only memory has a driver code, and when the memory control circuit unit 404 is enabled, the microprocessor unit will first execute the driver code segment to load the control command stored in the rewriteable non-volatile memory module 406 to the random access memory of the memory management circuit 502. After that, the microprocessor unit will run the control command to perform the operations such as data writing, reading, and erasing.

In addition, in another exemplary embodiment of the disclosure, the control command of the memory management circuit 502 may also be implemented in hardware. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit and the data processing circuit are coupled to the microcontroller. The memory cell management circuit is configured to manage the physical erasing unit of the rewriteable non-volatile memory module 406. The memory writing circuit is configured to issue a writing command to the rewriteable non-volatile memory module 406 to write data to the rewriteable non-volatile memory module 406. The memory reading circuit is configured to issue a reading command to the rewriteable non-volatile memory module 406 to read data from the rewriteable non-volatile memory module 406. The memory erasing circuit is configured to issue an erasing command to the rewriteable non-volatile memory module 406 to erase data from the rewriteable non-volatile memory module 406. The data processing circuit is configured to process the data that is to be written to the rewriteable non-volatile memory module 406 and the data that is read from the rewriteable non-volatile memory module 406.

The host interface 504 is coupled to the memory management circuit 502 and is configured to be coupled to the connection interface unit 402, so as to receive and identify a command and data sent by the host system 11. In other words, the command and data sent by the host system 11 is sent to the memory management circuit 502 through the host interface 504. In the exemplary embodiment, the host interface 504 is compatible with the SATA standard. However, it must be understood that the disclosure is not limited thereto. The host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard or other suitable data transmission standards.

The memory interface 506 is coupled to the memory management circuit 502 and is configured to access the rewriteable non-volatile memory module 406. In other words, the data to be written to the rewriteable non-volatile memory module 406 is converted to a format acceptable by the rewriteable non-volatile memory module 406 via the memory interface 506. Specifically, the memory interface 506 transmits a corresponding command sequence when the memory management circuit 502 wants to access the rewriteable non-volatile memory module 406. For example, command sequences may include a writing command sequence instructing to write data, a reading command sequence instructing to read data, an erasing command sequence instructing to erase data, and command sequences corresponding to and configured to instruct various memory operations (for example, operations such as changing a voltage level or executing garbage collection). The command sequences are, for example, generated by the memory management circuit 502 and transmitted to the rewriteable non-volatile memory module 406 through the memory interface 506. The command sequences may include one or more signals, or data on the bus. The signals or data may include a command code or a program code. For example, the reading command sequence includes information such as a reading identification code and a memory address.

In an exemplary embodiment, the memory control circuit unit 404 further includes a buffer memory 508, a power management circuit 510, and an error checking and correcting circuit 512.

The error checking and correcting circuit 512 is coupled to the memory management circuit 502 and is configured to execute an error checking and correcting procedure to ensure correctness of data. Specifically, the error checking and correcting circuit 512 generates a corresponding error checking and correcting code (ECC code) for data corresponding to a writing command when the memory management circuit 502 receives the writing command from the host system 11, and the memory management circuit 502 writes the data corresponding to the writing command and the corresponding error checking and correcting code to the rewriteable non-volatile memory module 406. After that, the error checking and correcting code corresponding to the data is read simultaneously when the data from the rewriteable non-volatile memory module 406 is read by the memory management circuit 502, and the error checking and correcting circuit 512 executes the error checking and correcting procedure on the read data according to the error checking and correcting code.

The buffer memory 508 is coupled to the memory management circuit 502 and is configured to temporarily store the data and command coming from the host system 11 or data coming from the rewriteable non-volatile memory module 406. The power management circuit 510 is coupled to the memory management circuit 502 and is configured to control power of the memory storage device 10.

Figure 6:
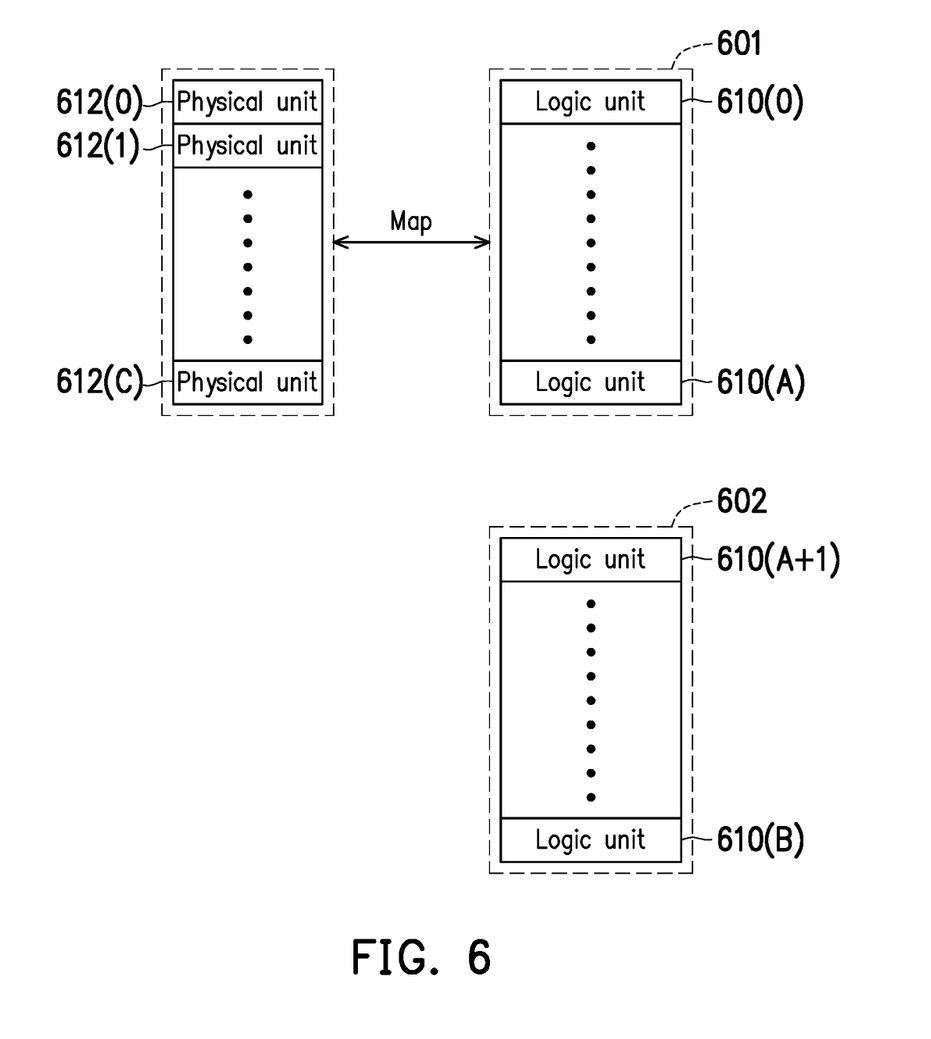
FIG. 6 is a schematic diagram of managing the rewriteable non-volatile memory module according to an exemplary embodiment of the disclosure.

FIG. 6 is a schematic diagram of managing the rewriteable non-volatile memory module according to an exemplary embodiment of the disclosure.

With reference to FIG. 6, the memory management circuit 502 logically groups the memory cells of the rewriteable non-volatile memory module 406 into physical units 610(0) to 610(B). In the exemplary embodiment, each of the physical units 610(0) to 610(B) refers to a physical erasing unit. However, in another exemplary embodiment, each of the physical units 610(0) to 610(B) may also include multiple physical erasing units.

In an exemplary embodiment, the rewriteable non-volatile memory module 406 of the memory storage device 10 is managed using a physical erasing unit as a basis (also called block based). The memory management circuit 502 logically groups the physical units 610(0) to 610(B) into a storage region 601 and a spare region 602. The physical units 610(0) to 610(A) in the storage region 601 store data, and the physical units 610(A+1) to 610(B) in the spare region 602 have not been used to store data. For example, each of the physical units belonging to the storage region 601 may store valid data and/or invalid data, and a certain physical unit belonging to the storage region 601 is associated with the spare region 602 after the certain physical unit has being erased.

In an exemplary embodiment, the memory management circuit 502 writes the data corresponding to the writing command to a certain physical erasing unit of the storage region 601 after receiving the writing command from the host system 11. For example, the writing command may be a sequential writing command or a random writing command. For example, the memory management circuit 502 extracts a physical erasing unit from the spare region 602 when the memory management circuit 502 receives the sequential writing command from the host system 11 and wants to perform writing to a physical erasing unit of the storage region 601. Then, the memory management circuit 502 respectively writes the valid old data in the physical erasing unit to be updated in the storage region 601 and new data to be written to a physical programming unit of the physical erasing unit extracted from the spare region 602. Subsequently, the memory management circuit 502 associates the physical erasing unit with the newly written data to the storage region 601, and erases the physical erasing unit of the original storage region 601, and then associates the physical erasing unit of the original storage region 601 with the spare region 602.

In another exemplary embodiment, the memory management circuit 502 writes data by a means of one physical programming unit after another physical programming unit when the memory management circuit 502 receives the random writing command from the host system 11 and wants to perform writing to a physical erasing unit of the storage region 601. Specifically, the memory management circuit 502 extracts an empty physical erasing unit from the spare region 602 to serve as a currently in use physical erasing unit for writing of data. And, the memory management circuit 502 extracts another empty physical erasing unit from the spare region 602 and associates it with the storage region 601 as to serve as a currently in use physical erasing unit, so as to continue writing other data, when the currently in use physical erasing unit is full. However, the disclosure does not limit the data writing mechanism here.

In an exemplary embodiment, the memory management circuit 502 configures logic units 612(0) to 612(C) to map at least a portion of the physical units 610(0) to 610(A) in the storage region 601. In the exemplary embodiment, the host system 11 accesses the data stored in the storage region 601 through a logical address (LA). Therefore, each of the logic units 612(0) to 612(C) refers to a logical address. Each of the logical addresses has multiple logical subunits to map the physical programming unit included in the physical unit corresponding to the logical address. However, in another exemplary embodiment, each of the logic units 612(0) to 612(C) may also be composed of multiple consecutive (for example, consecutively numbered) logical addresses.

In an exemplary embodiment, the memory management circuit 502 records a mapping relationship between the logic unit and the physical unit (also called a logical-to-physical mapping relationship) in at least one logical-to-physical mapping table, so as to identify which physical erasing unit is data of each logical address being stored in. The memory management circuit 502 may execute data access of the memory storage device 10 according to the logical-to-physical mapping table when the host system 11 wants to read data from the memory storage device 10 or write data to the memory storage device 10. In an exemplary embodiment, the logical-to-physical mapping table and specific management data (for example, a management table recording management information of the memory storage device 10) are stored in other physical units that do not belong to the storage region 601 and the spare region 602, so as to prevent modification by a user.

In an exemplary embodiment, the mapping relationship between a certain logic unit and the physical unit storing an old data belonging to the logic unit is removed when the data belonging to the logic unit is updated, and a mapping relationship between the logic unit and the physical unit storing a current data (or a latest data) belonging to the logic unit is established. However, in another exemplary embodiment, the mapping relationship between a certain logic unit and the physical unit storing the old data belonging to the logic unit may still be maintained when the data belonging to the logic unit is updated.

In an exemplary embodiment, the rewriteable non-volatile memory module 406 of the memory storage device 10 is managed based on the physical erasing units. The physical erasing unit of the storage region 601 may have two states regardless of the sequential writing or random writing mechanisms, which are a state of fully written with data and a state of not fully written with data.

Figure 7:
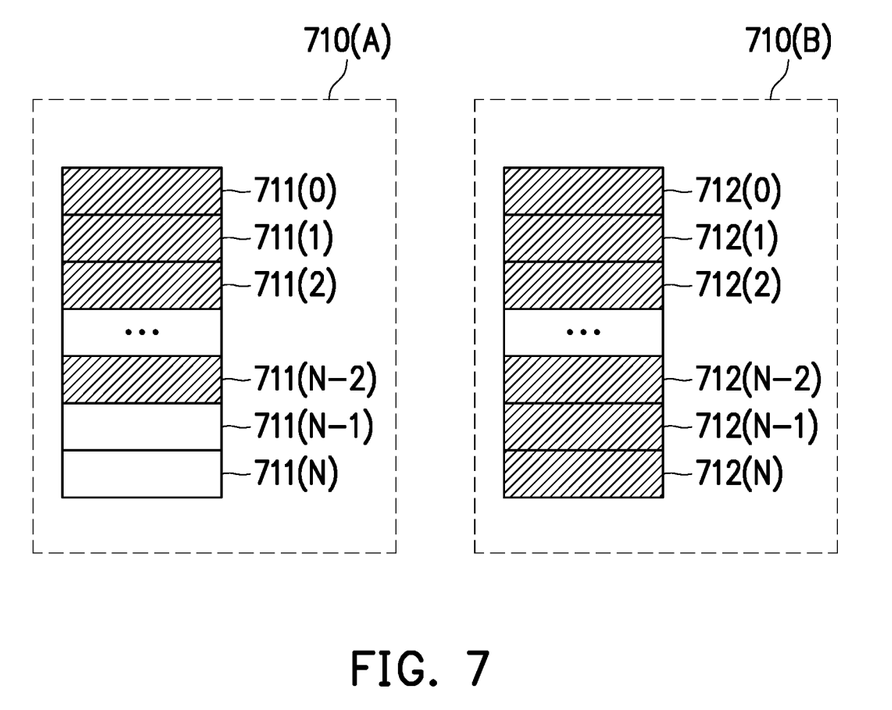
FIG. 7 is a schematic diagram illustrating a data storage state of a physical erasing unit according to an exemplary embodiment of the disclosure.

FIG. 7 is a schematic diagram illustrating a data storage state of the physical erasing unit according to an exemplary embodiment of the disclosure. With reference to FIG. 7, in FIG. 7, physical programming units 711(0) to 711(N−2) and 712(0) to 712(N) shaded by diagonal lines are the physical programming units that have written data. Each of the physical programming units may store valid data and/or invalid data. In the exemplary embodiment, since the physical unit 710(A) still includes the unprogrammed physical programming units 711(N−1) to 711(N), a data writing state of the physical unit 710(A) is the state of not fully written with data, which is called an open block. In addition, since the physical programming units 712(0) to 712(N) included in the physical unit 710(B) have been programmed, the data writing state of the physical unit 710(B) is the state of fully written with data, which is called a closed block. However, in some memory storage devices, reading of the data stored in the physical erasing unit causes a great number of bit errors when the physical erasing unit to be read is in the state of not fully written with data.

In the exemplary embodiment, the memory management circuit 502 may determine the physical programming unit (also called a first physical programming unit) mapped to the logical address instructed to be read by a reading command and the physical erasing unit (also called a first physical erasing unit) corresponding to the physical programming unit according to the logical-to-physical mapping table, after receiving the reading command from the host system 11. The reading command instructs to read data stored in the first physical programming unit (also called a second data). In addition, the memory management circuit 502 determines whether the data writing state of the first physical erasing unit corresponding to the first physical programming unit satisfies a predetermined state. The data writing state of the first physical erasing unit is the state of fully written with data when the predetermined state is satisfied, and the data writing state of the first physical erasing unit is the state of not fully written with data when the predetermined state is not satisfied. For example, the memory management circuit 502 may determine whether the first physical erasing unit is an open block or a closed block according to the logical-to-physical mapping table or other data configured to reflect a storage state of the first physical erasing unit. The first physical erasing unit is an open block when it still has a physical programming unit that has not been programmed. On the contrary, the first physical erasing unit is a closed block when all of the physical programming units of the first physical erasing unit are programmed. In an exemplary embodiment, the predetermined state is that a state in which all of the physical programming units included in the first physical erasing unit have been programmed. The memory management circuit 502 may read the logic-to-physical mapping table, and determine whether all of the physical programming units included in the first physical erasing unit have been programmed according to the logic-to-physical mapping table. In another exemplary embodiment, the predetermined state is a state in which other physical programming units (pair pages) associated with the same word line as the first physical programming unit have been programmed. The memory management circuit 502 may read the word line corresponding to the physical programming unit included in the first physical erasing unit, and determine whether the other physical programming units associated with the same word line as the first physical programming unit have all been programmed according to an amount of data read. However, those skilled in the art should know other methods of determining the data writing state of the physical erasing unit, and the disclosure is not limited thereto.

In the exemplary embodiment, the memory management circuit 502 directly reads the second data stored in the first physical programming unit according to the logical address instructed to be read by the reading command received from the host system 11 when the physical erasing unit is determined to be a closed block (that is, the data writing state satisfies the predetermined state) by the memory management circuit 502, so as to respond to the reading command.

In the exemplary embodiment, the memory management circuit 502 selects the data (also called a first data) and writes the first data to the physical programming unit (also called a second physical programming unit) with no written data in the first physical erasing unit when the physical erasing unit is determined to be an open block (that is, the data writing state does not satisfies the predetermined state) by the memory management circuit. For example, the memory management circuit 502 may determine the second physical programming unit with no written data in the first physical erasing unit according to the logic-to-physical mapping table, but the disclosure is not limited thereto. The first physical erasing unit may include one or more second physical programming units, and a data length of the first data satisfies a data length corresponding to the one or more second physical programming units. In the exemplary embodiment, the operation of writing the first data to the second physical programming unit by the memory management circuit 502 is not in response to the writing command sent by the host system 11.

In an exemplary embodiment, the first data may be valid data read from the buffer memory 508 by the memory management circuit 502. For example, the memory management circuit 502 calculates the data length corresponding to the second physical programming unit included in the first physical erasing unit, and reads the valid data of the data length from the buffer memory 508, so as to generate the first data.

In an exemplary embodiment, the first data may be dummy data generated by the memory management circuit 502 according to the valid data stored in the buffer memory 508. For example, the memory control circuit unit 404 also includes a data conversion circuit (not shown). The memory management circuit 502 calculates the data length corresponding to the second physical programming unit included in the first physical erasing unit, and reads the valid data of the data length from the buffer memory 508. The memory management circuit 502 may input the valid data to the data conversion circuit, and the data conversion circuit is configured to randomly shuffle the valid data inputted to the data conversion circuit and output corresponding virtual data, so as to generate the first data. It should be understood that those skilled in the art should know how to randomly scramble data, which will not be repeated here.

The memory management circuit 502 fills (writes) the first data to the second physical programming unit in the first physical erasing unit after the first data is generated, so that the filled first physical erasing unit is converted to a closed block. In the exemplary embodiment, the memory management circuit 502 reads the second data stored in the first physical programming unit according to the logical address instructed to be read by the reading command received from the host system 11 after the first data is filled (written) to the second physical programming unit in the first physical erasing unit by the memory management circuit 502, so as to respond to the reading command.

In another exemplary embodiment, the memory management circuit 502 re-determines again whether the data writing status of the first physical erasing unit satisfies the predetermined state after filling (writing) the first data to the second physical programming unit in the first physical erasing unit. In addition, the memory management circuit 502 reads the second data stored in the first physical programming unit according to the logical address instructed to be read by the reading command received from the host system 11 in response to determination of satisfaction of the predetermined state, so as to respond to the reading command. On the other hand, the memory management circuit 502 may select data (also called a third data) again, and write the third data to the physical programming unit with no written data in the first physical erasing unit when the predetermined state is determined to be not satisfied. Here, the memory management circuit 502 repeatedly writes data and determines the data writing state of the first physical erasing unit. The memory management circuit 502 reads the second data after the predetermined state is satisfied, so as to respond to the reading command. The specific operational details are same as or similar to the foregoing operations of determining whether the predetermined state is satisfied and data selection, which will not be repeated here.

For example, with reference to FIG. 7, it is assumed that the physical programming unit mapped to the logical address instructed to be read by the reading command received by the memory management circuit 502 from the host system 11 is the physical programming unit 711(1), and the physical unit 710(A) corresponding to the physical programming unit 711(1) is the open block. The memory management circuit 502 calculates data length corresponding to the physical programming units 711(N−1) to 711(N), and reads valid data of the data length from the buffer memory 508, so as to generate the first data. Then, the memory management circuit 502 fills (writes) the first data to the physical programming units 711(N−1) to 711(N), enabling the filled physical unit 710(A) to convert to a closed block. In addition, the memory management circuit 502 reads the data stored in the physical programming unit that is the physical programming unit 711(1) according to the logical address instructed to be read by the reading command after filling (writing) the first data to the physical programming units 711(N−1) to 711(N).

In other words, in the example of the open block, the memory management circuit 502 uses the first data to fill up the physical erasing unit corresponding to the physical programming unit which the host system 11 wants to read, so as to convert the open block to the closed block. In addition, the memory management circuit 502 executes the reading command to read data corresponding to the reading command from the rewriteable non-volatile memory module 406 after the physical erasing unit is filled up. Accordingly, a great number of bit errors due to the reading of the physical programming unit included in the physical erasing unit when the physical erasing unit is in the state of not fully written with data may be prevented.

In another exemplary embodiment, the memory management circuit 502 directly reads the second data stored in the first physical programming unit according to the logical address instructed to be read by the reading command after receiving the reading command from the host system 11. The memory management circuit 502 copies the second data to the buffer memory 508, and the error checking and correcting circuit 512 is configured to execute a decoding operation on the second data.

Error correcting codes originally generated during a single-frame encoding on the second data may be read together when a single-frame decoding operation is to be executed on the second data. Then, in the single frame decoding corresponding to the second data, the second data may be decoded and corrected based on the error correcting codes. In an exemplary embodiment, the second data is also called a target data to be corrected in the corresponding single-frame decoding. The second data may be regarded as a data unit with an uncorrectable (referred to as UNC) error when the second data is not able to be corrected by the corresponding single-frame decoding. The second data may be regarded as a data unit without an UNC error when the second data is successfully decoded and corrected by the single-frame decoding, which represents success by the corresponding single-frame decoding. In other words, the UNC error refers to an error in the data unit that cannot be corrected by the corresponding single-frame decoding.

In the exemplary embodiment, the memory management circuit 502 only executes the foregoing operation of using the first data to fill up the physical erasing unit corresponding to the physical programming unit which the host system 11 wants to read, so as to convert the open block to the closed block, and executes the reading command again to read the second data corresponding to the reading command from the rewriteable non-volatile memory module 406 when the second data has a UNC error. The specific operational details are the same or similar to the foregoing operation of the open block, which will not be repeated here.

Figure 8:
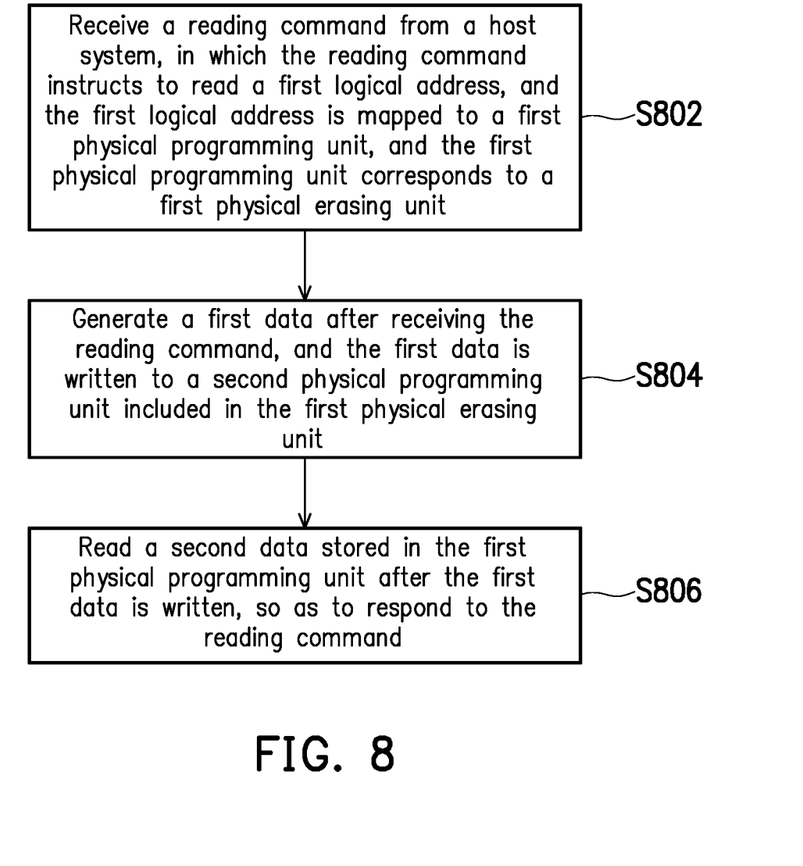
FIG. 8 is a flowchart of a data accessing method according to an exemplary embodiment of the disclosure.

FIG. 8 is a flowchart of a data accessing method according to an exemplary embodiment of the disclosure. In Step S802, the reading command from the host system is received. The reading command instructs to read a first logical address, and the first logical address is mapped to the first physical programming unit, and the first physical programming unit corresponds to the first physical erasing unit. In Step S804, the first data is generated after receiving the reading command, and the first data is written to the second physical programming unit included in the first physical erasing unit. In Step S806, the second data stored in the first physical programming unit is read after the first data is written, so as to respond to the reading command.

It is worth noting that each of the steps in FIG. 8 may be implemented as multiple program codes or circuits, and is not limited by the disclosure. In addition, the method in FIG. 8 may be used in conjunction with the above exemplary embodiments, or may be used alone, and is not limited by the disclosure.

In summary, the data accessing method, the memory control circuit unit, and the memory storage device according to the exemplary embodiments of the disclosure may convert the physical erasing unit having the state of not fully written with data to the state of fully written with data, so as to prevent the great number of bit errors due to the reading of the physical programming unit of the physical erasing unit when the physical erasing unit is in the state of not fully written with data. Based on this, the memory storage device can reduce the probability of generating bit errors during data reading according to the data accessing method of the disclosure, so as to reduce errors generated during the reading data.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

The previously described exemplary embodiments of the disclosure have the advantages aforementioned, wherein the advantages aforementioned are not required in all versions of the disclosure.

It should be apparent to those skilled in the art that various modifications and variations can be made to the structure of the disclosure without departing from the scope or spirit of the disclosure. In view of the foregoing, it is intended that the disclosure cover modifications and variations of the disclosure, provided that they fall within the scope of the following claims and their equivalents.

What is claimed is:

1. A data accessing method for a rewriteable non-volatile memory module controlled by a memory control circuit unit, wherein the rewriteable non-volatile memory module comprises a plurality of physical erasing units, and each of the plurality of physical erasing units comprises a plurality of physical programming units, the data accessing method comprising:

receiving a reading command from a host system, wherein the reading command instructs to read a first logical address, the first logical address is mapped to a first physical programming unit, and the first physical programming unit corresponds to a first physical erasing unit;

generating a first data after the reading command is received, and the first data is written to a second physical programming unit comprised in the first physical erasing unit; and reading a second data stored in the first physical programming unit after the first data is written, so as to respond to the reading command, wherein the first physical erasing unit comprises a plurality of the second physical programming unit, and a data length of the first data satisfies a data length corresponding to at least one of the plurality of second physical programming units, wherein each of the plurality of second physical programming units is a physical programming unit with no written data in the first physical erasing unit.

2. The data accessing method according to claim 1, wherein generation of the first data comprises:

calculating a data length corresponding to the second physical programming unit; and reading valid data of the data length from the memory control circuit unit, so as to generate the first data.

3. The data accessing method according to claim 1, wherein generation of the first data comprises:

calculating a data length corresponding to the second physical programming unit; and reading valid data of the data length from the memory control circuit unit and randomly scrambling the valid data, so as to generate the first data.

4. The data accessing method according to claim 1, wherein before writing the first data to the second physical programming unit comprised in the first physical erasing unit, the method further comprises:

reading the second data stored in a plurality of physical addresses of the first physical programming unit; and executing a decoding operation on the second data, wherein the first data is generated according to data stored in the memory control circuit unit when the second data decoded by the decoding operation has a data unit with an uncorrectable error.

5. The data accessing method according to claim 4, further comprising:

re-reading the second data stored in the first physical programming unit after the first data is written.

6. The data accessing method according to claim 1, wherein the rewriteable non-volatile memory module is managed based on the plurality of physical erasing units.

7. The data accessing method according to claim 1, wherein after receiving the reading command, the method further comprises:

determining whether a data writing state of the first physical erasing unit satisfies a predetermined state, wherein the second data is directly read when the data writing state satisfies the predetermined state, so as to respond to the reading command, wherein the second data is read after the first data is written when the data writing state does not satisfy the predetermined state, so as to respond to the reading command.

8. The data accessing method according to claim 7, wherein the predetermined state is a state in which all of the physical programming units comprised in the first physical erasing unit have been programmed, wherein reading the second data after the first data is written when the data writing state does not satisfy the predetermined state, so as to respond to the reading command, comprises:

writing the first data to the second physical programming unit comprised in the first physical erasing unit, and determining whether the data writing state satisfies the predetermined state; and reading the second data in response to determination of satisfaction of the predetermined state, so as to respond to the reading command.

9. The data accessing method according to claim 7, wherein the predetermined state is a state in which other physical programming units associated with a same word line as the first physical programming unit have been programmed, wherein reading the second data after the first data is written when the data writing state does not satisfy the predetermined state, so as to respond to the reading command, comprises:

writing the first data to the other physical programming unit associated with the same word line as the first physical programming unit, and determining whether the data writing state satisfies the predetermined state; and reading the second data in response to determination of satisfaction of the predetermined state, so as to respond to the reading command.

10. The data accessing method according to claim 1, wherein writing the first data to the second physical programming unit comprised in the first physical erasing unit is not in response to a writing command sent by the host system.

11. A memory control circuit unit for controlling a rewriteable non-volatile memory module, comprising:

a host interface, configured to be coupled to a host system;

a memory interface, configured to be coupled to the rewriteable non-volatile memory module, wherein the rewriteable non-volatile memory module comprises a plurality of physical erasing units, and each of the plurality of physical erasing units comprises a plurality of physical programming units;

a buffer memory;

an error checking and correcting circuit;

a memory management circuit, coupled to the host interface and the memory interface, wherein the memory management circuit is configured to receive a reading command from the host system, wherein the reading command instructs to read a first logical address, the first logical address is mapped to a first physical programming unit, and the first physical programming unit corresponds to a first physical erasing unit, the memory management circuit is further configured to generate a first data after receiving the reading command, and write the first data to a second physical programming unit comprised in the first physical erasing unit, and the memory management circuit is further configured to read a second data stored in the first physical programming unit after the first data is written, so as to respond to the reading command, wherein the first physical erasing unit comprises a plurality of the second physical programming unit, and a data length of the first data satisfies a data length corresponding to at least one of the plurality of second physical programming units, wherein each of the plurality of second physical programming units is a physical programming unit with no written data in the first physical erasing unit.

12. The memory control circuit unit according to claim 11, wherein the memory management circuit is further configured to calculate a data length corresponding to the second physical programming unit; and the memory management circuit is further configured to read valid data of the data length from the buffer memory, so as to generate the first data.

13. The memory control circuit unit according to claim 11, wherein the memory management circuit is further configured to calculate a data length corresponding to the second physical programming unit; and the memory management circuit is further configured to read valid data of the data length from the buffer memory and randomly scramble the valid data, so as to generate the first data.

14. The memory control circuit unit according to claim 11, wherein the memory management circuit is further configured to read the second data stored in a plurality of physical addresses of the first physical programming unit, and the error checking and correcting circuit is configured to execute a decoding operation on the second data, wherein the memory management circuit is further configured to generate the first data according to data stored in the buffer memory when the second data decoded by the decoding operation has a data unit with an uncorrectable error.

15. The memory control circuit unit according to claim 14, wherein the memory management circuit is further configured to re-read the second data stored in the first physical programming unit after the first data is written.

16. The memory control circuit unit according to claim 11, wherein the rewriteable non-volatile memory module is managed based on the plurality of physical erasing units.

17. The memory control circuit unit according to claim 11, wherein the memory management circuit is further configured to determine whether a data writing state of the first physical erasing unit satisfies a predetermined state, wherein the memory management circuit is further configured to directly read the second data when the data writing state satisfies the predetermined state, so as to respond to the reading command, wherein the memory management circuit is further configured to read the second data after the first data is written when the data writing state does not satisfy the predetermined state, so as to respond to the reading command.

18. The memory control circuit unit according to claim 17, wherein the predetermined state is a state in which all of the physical programming units comprised in the first physical erasing unit have been programmed, wherein the memory management circuit is further configured to read the second data after the first data is written when the data writing state does not satisfy the predetermined state, so as to respond to the reading command, and this operation comprises:

the memory management circuit is further configured to write the first data to the second physical programming unit comprised in the first physical erasing unit and determine whether the data writing state satisfies the predetermined state; and the memory management circuit is further configured to read the second data in response to determination of satisfaction of the predetermined state, so as to respond to the reading command.

19. The memory control circuit unit according to claim 17, wherein the predetermined state is a state in which other physical programming units associated with a same word line as the first physical programming unit have been programmed, wherein the memory management circuit is further configured to read the second data after the first data is written when the data writing state does not satisfy the predetermined state, so as to respond to the reading command, and this operation comprises:

the memory management circuit is further configured to write the first data to the other physical programming unit associated with the same word line as the first physical programming unit and determine whether the data writing state satisfies the predetermined state; and the memory management circuit is further configured to read the second data in response to determination of satisfaction of the predetermined state, so as to respond to the reading command.

20. The memory control circuit unit according to claim 11, wherein writing the first data to the second physical programming unit comprised in the first physical erasing unit by the memory management circuit is not in response to a writing command sent by the host system.

21. A memory storage device, comprising:

a connection interface unit, configured to be coupled to a host system;

a rewriteable non-volatile memory module, comprising a plurality of physical erasing units, wherein each of the plurality of physical erasing units comprises a plurality of physical programming units; and a memory control circuit unit, coupled to the connection interface unit and the rewriteable non-volatile memory module, wherein the memory control circuit unit is configured to receive a reading command from the host system, wherein the reading command instructs to read a first logical address, the first logical address is mapped to a first physical programming unit, and the first physical programming unit corresponds to a first physical erasing unit, the memory control circuit unit is further configured to generate a first data after receiving the reading command, and write the first data to the second physical programming unit comprised in the first physical erasing unit, and the memory control circuit unit is further configured to read the second data stored in the first physical programming unit after the first data is written, so as to respond to the reading command, wherein the first physical erasing unit comprises a plurality of the second physical programming unit, and a data length of the first data satisfies a data length corresponding to at least one of the plurality of second physical programming units, wherein each of the plurality of second physical programming units is a physical programming unit with no written data in the first physical erasing unit.

22. The memory storage device according to claim 21, wherein the memory control circuit unit is further configured to calculate a data length corresponding to the second physical programming unit; and the memory control circuit unit is further configured to read valid data of the data length from the memory control circuit unit, so as to generate the first data.

23. The memory storage device according to claim 21, wherein the memory control circuit unit is further configured to calculate a data length corresponding to the second physical programming unit; and the memory control circuit is further configured to read valid data of the data length from the memory control circuit unit and randomly scramble the valid data, so as to generate the first data.

24. The memory storage device according to claim 21, wherein the memory control circuit unit is further configured to read the second data stored in a plurality of physical addresses of the first physical programming unit; and the memory control circuit unit is further configured to execute a decoding operation on the second data, wherein the memory control circuit unit is further configured to generate the first data according to data stored in the memory control circuit unit when the second data decoded by the decoding operation has a data unit with an uncorrectable error.

25. The memory storage device according to claim 24, wherein the memory control circuit unit is further configured to re-read the second data stored in the first physical programming unit after the first data is written.

26. The memory storage device according to claim 21, wherein the rewriteable non-volatile memory module is managed based on the plurality of physical erasing units.

27. The memory storage device according to claim 21, wherein the memory control circuit unit is further configured to determine whether a data writing state of the first physical erasing unit satisfies a predetermined state, wherein the memory control circuit unit is further configured to directly read the second data when the data writing state satisfies the predetermined state, so as to respond to the reading command, wherein the memory control circuit unit is further configured to read the second data after the first data is written when the data writing state does not satisfy the predetermined state, so as to respond to the reading command.

28. The memory storage device according to claim 27, wherein the predetermined state is a state in which all of the physical programming units comprised in the first physical erasing unit have been programmed, wherein the memory control circuit unit is further configured to read the second data after the first data is written when the data writing state does not satisfy the predetermined state, so as to respond to the reading command, and this operation comprises:

the memory control circuit unit is further configured to write the first data to the second physical programming unit comprised in the first physical erasing unit and determine whether the data writing state satisfies the predetermined state; and the memory control circuit unit is further configured to read the second data in response to determination of satisfaction of the predetermined state, so as to respond to the reading command.

29. The memory storage device according to claim 27, wherein the predetermined state is a state in which other physical programming units associated with a same word line as the first physical programming unit have been programmed, wherein the memory control circuit unit is further configured to read the second data after the first data is written when the data writing state does not satisfy the predetermined state, so as to respond to the reading command, and this operation comprises:

the memory control circuit unit is further configured to write the first data to the other physical programming unit associated with the same word line as the first physical programming unit and determine whether the data writing state satisfies the predetermined state; and
   the memory control circuit unit is further configured to read the second data in response to determination of satisfaction of the predetermined state, so as to respond to the reading command.

30. The memory storage device according to claim 21, wherein writing the first data to the second physical programming unit comprised in the first physical erasing unit by the memory control circuit unit is not in response to a writing command sent by the host system.

\* \* \* \* \*